United States Patent
Izumi et al.

(10) Patent No.: US 9,528,461 B2
(45) Date of Patent: Dec. 27, 2016

(54) OBSTACLE DETECTION DEVICE FOR VEHICLE AND MISACCELERATION MITIGATION DEVICE USING THE SAME

(71) Applicant: Mitsubishi Jidosha Kogyo Kabushiki Kaisha, Tokyo (JP)

(72) Inventors: Hiroshi Izumi, Okazaki (JP); Ayaka Kobayashi, Nagoya (JP); Muneyuki Maeda, Aichi (JP); Yohei Nagakura, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/953,097

(22) Filed: Nov. 27, 2015

(65) Prior Publication Data

US 2016/0153380 A1 Jun. 2, 2016

(30) Foreign Application Priority Data

Nov. 28, 2014 (JP) .................. 2014-241418

(51) Int. Cl.
| | |
|---|---|
| *F02D 41/12* | (2006.01) |
| *G08G 1/16* | (2006.01) |
| *G01S 7/491* | (2006.01) |
| *G01S 17/08* | (2006.01) |
| *G01S 17/93* | (2006.01) |

(52) U.S. Cl.
CPC ............. *F02D 41/12* (2013.01); *G01S 7/4912* (2013.01); *G01S 17/08* (2013.01); *G01S 17/936* (2013.01); *G08G 1/165* (2013.01); *G08G 1/168* (2013.01)

(58) Field of Classification Search
CPC ........ F02D 41/12; G01S 7/4912; G01S 17/08; G01S 17/936; G08G 1/165; G08G 1/168

USPC .......................................................... 701/99
See application file for complete search history.

(56) References Cited

U.S. PATENT DOCUMENTS

| | | | | |
|---|---|---|---|---|
| 2007/0285041 | A1* | 12/2007 | Jones .................... | G05D 1/0219 318/568.12 |
| 2014/0350836 | A1* | 11/2014 | Stettner ................. | G01S 17/023 701/301 |
| 2015/0254861 | A1* | 9/2015 | Chornenky ............ | G01C 15/00 348/135 |
| 2015/0352721 | A1* | 12/2015 | Wicks .................... | B25J 9/1664 700/228 |

(Continued)

FOREIGN PATENT DOCUMENTS

| | | |
|---|---|---|
| DE | 103 51 915 A1 | 6/2005 |
| JP | 2014-029591 A | 2/2014 |

*Primary Examiner* — McDieunel Marc
*Assistant Examiner* — James E Stroud
(74) *Attorney, Agent, or Firm* — Birch, Stewart, Kolasch & Birch, LLP

(57) ABSTRACT

To prevent a decrease in detection accuracy of an obstacle that occurs when an obstacle detection distance of an infrared beam at the center is set longer than an infrared beam of at least one of the left or the right, an obstacle detection device for a vehicle which detects an obstacle in front includes an effective-range control part 19 which controls the maximum effective distance of obstacle detection. The effective-range control part 19 extends the maximum effective distance of the second emitting-and-receiving parts 11b, 11c disposed on at least one of the left or the right from an initial value L1 to an extended value L2, when the first emitting-and-receiving part 11a at the center detects an obstacle 5.

16 Claims, 8 Drawing Sheets

(56) References Cited

U.S. PATENT DOCUMENTS

| | | | |
|---|---|---|---|
| 2016/0003946 A1* | 1/2016 | Gilliland | G01S 17/10 356/5.01 |
| 2016/0009177 A1* | 1/2016 | Brooks | B60K 35/00 340/468 |
| 2016/0151653 A1* | 6/2016 | Ge | A62C 3/025 169/46 |
| 2016/0158587 A1* | 6/2016 | Ge | A62C 3/025 169/56 |
| 2016/0166862 A1* | 6/2016 | Qui | A62C 3/025 169/24 |
| 2016/0192876 A1* | 7/2016 | Proud | A61B 5/1123 600/595 |
| 2016/0213308 A1* | 7/2016 | Proud | A61B 5/1118 |

\* cited by examiner

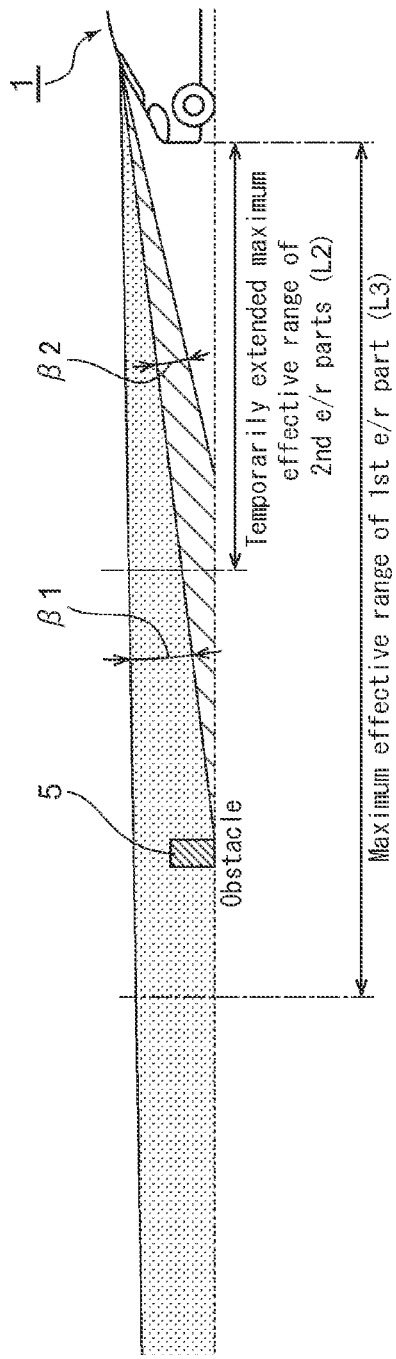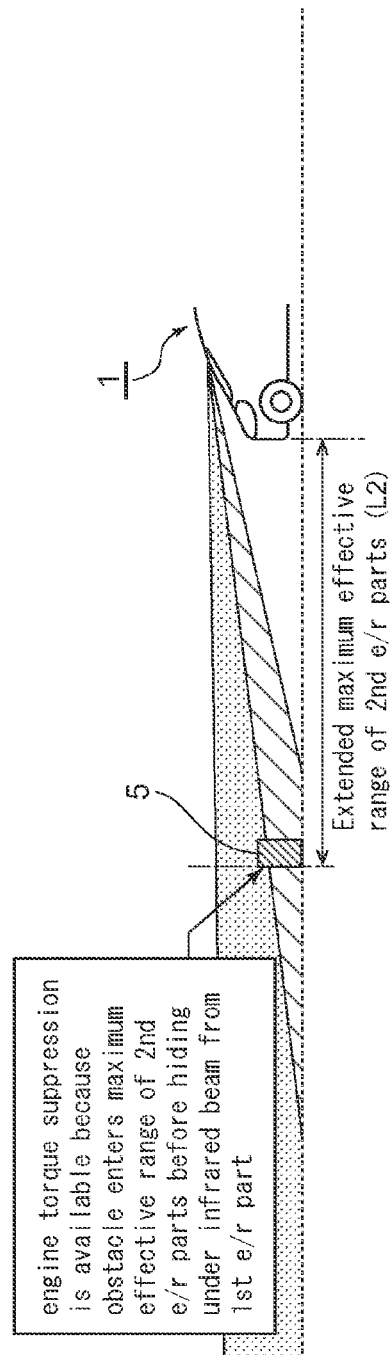
FIG. 5A
FIG. 5B

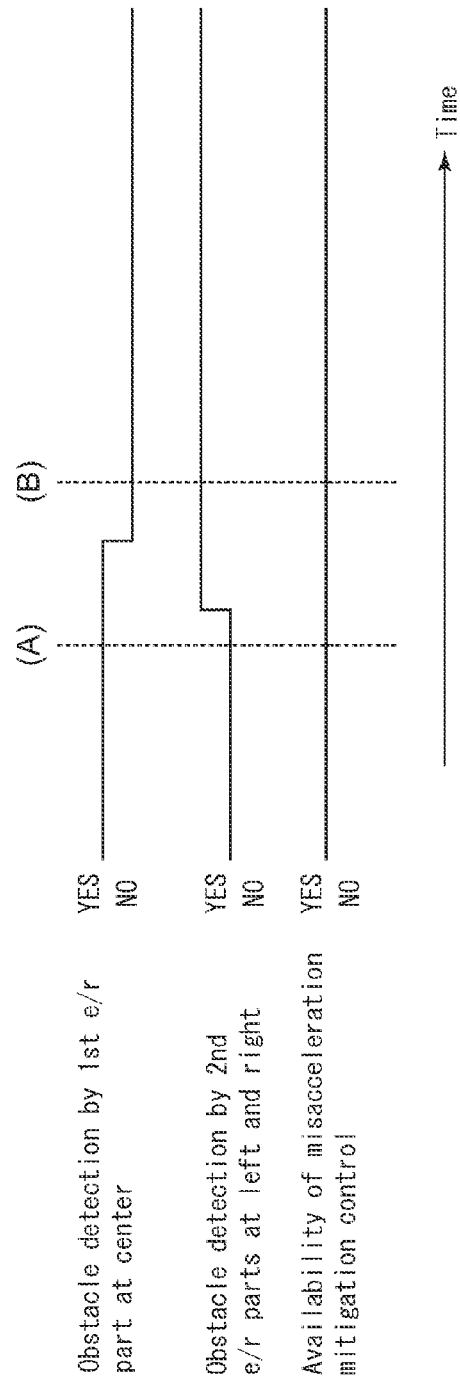

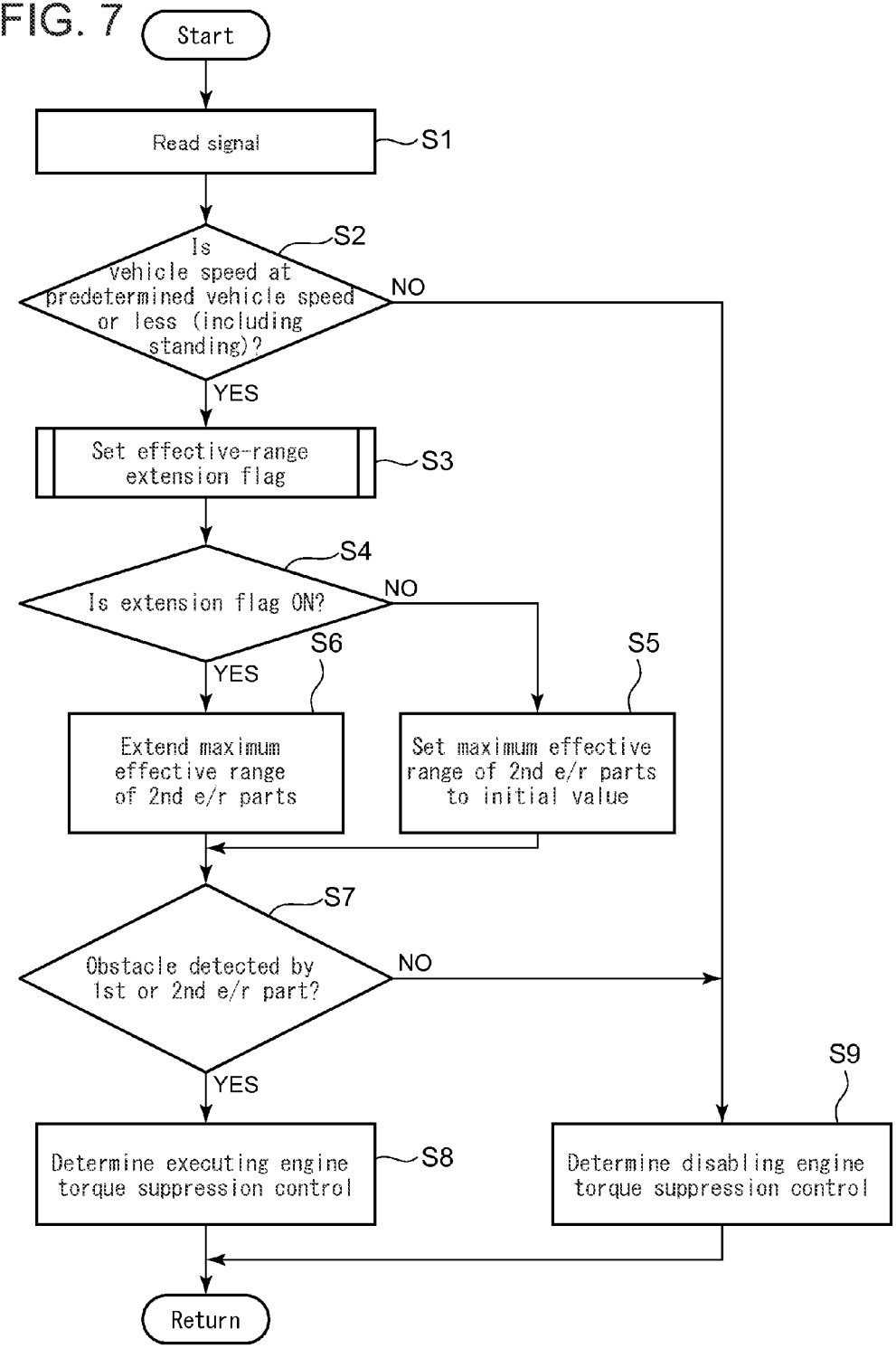

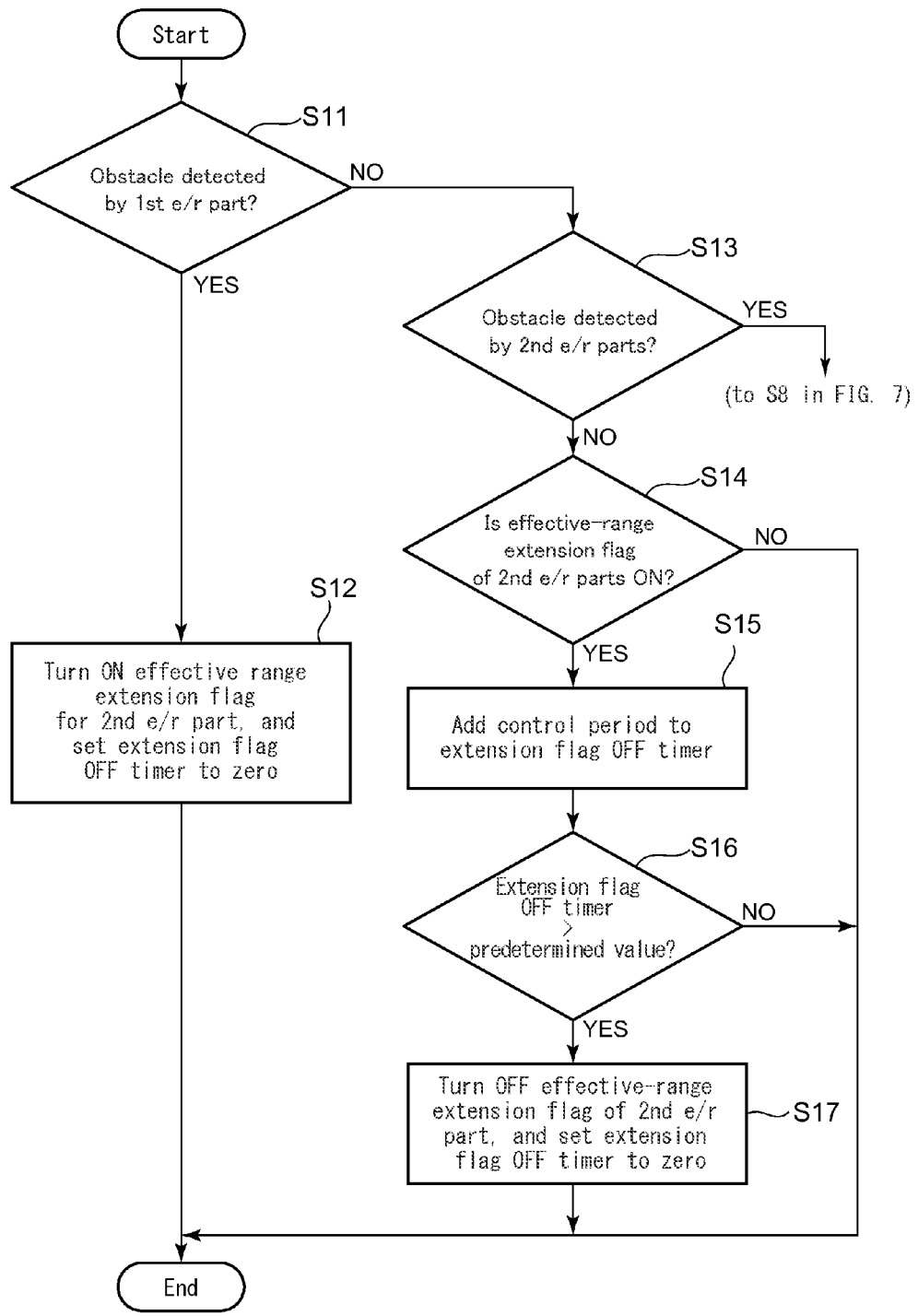

OBSTACLE DETECTION DEVICE FOR VEHICLE AND MISACCELERATION MITIGATION DEVICE USING THE SAME

TECHNICAL FIELD

The present disclosure relates to an obstacle detection device for a vehicle and a misacceleration mitigation device using the same.

BACKGROUND

There is a known misacceleration mitigation device which mitigates acceleration or start of a vehicle by suppressing an engine output even when an accelerator pedal is pressed in, if an obstacle is detected within a predetermined distance in front of the vehicle by an obstacle detector while the vehicle is moving at a predetermined speed or less or while the vehicle is standing.

For instance, Patent Document 1 (JP2014-29591A) discloses an erroneous start suppression device for a vehicle, which includes a travel-path prediction unit for predicting a travel path of a vehicle on the basis of a steering angle. An obstacle detected by a detector is regarded as an obstacle for an erroneous start suppression control only when the detected obstacle is in the predicted travel path, and an obstacle detected by the detector is not regarded as an obstacle for the erroneous start suppression control when the detected obstacle is off the predicted travel path.

In the erroneous start suppression device disclosed in Patent Document 1 (JP2014-29591A), three infrared beams (left, center, and right) are emitted in front of the vehicle to detect an obstacle in front.

An obstacle detection device emits the three infrared beam waves simultaneously in front of the vehicle, and the first infrared beam wave is emitted slightly to the left side in front of the vehicle so as to form the first detection region S1 that has a fan shape in a planar view and expands in a horizontal direction in front of the vehicle at a predetermined expansion angle. The second infrared beam wave is emitted to the front of the vehicle so as to form the second detection region S2 that has a fan shape in a planar view and expands in a horizontal direction in front of the vehicle 1 at a predetermined expansion angle. The third infrared beam wave is emitted slightly to the right side in front of the vehicle so as to form the third detection region S3 that has a fan shape in a planar view and expands in a horizontal direction in front of the vehicle at a predetermined expansion angle. The above first to third detection regions S1 to S3 are arranged next to one another in a horizontal direction, and collectively form a single integrated detection region S of a wide angle in front of the vehicle 1.

However, the three infrared beams (left, center, and right) in Patent Document 1 (JP2014-29591A) forming the first to third detection regions S1 to S3 have similar expansion angles and obstacle-detection distances in the horizontal direction. Thus, if an effective distance for detecting an obstacle is extended, the infrared beams at both of the left and right sides would be emitted beyond the width of the vehicle to detect a pedestrian or an object in a side-strip region, and thereby the obstacle detection in front of the vehicle includes an erroneous judgment, which presumably causes a problem in detection accuracy.

Thus, there is a technique under consideration which prevents unnecessary suppression of engine torque and improves the accuracy of the misacceleration mitigation control by imposing a limitation on the obstacle-detection distances of the infrared beams at the left and right sides so that the infrared beams do not reach beyond the width of the vehicle to prevent erroneous judgments, i.e., by performing the control only when an obstacle is detected within the range of the width of the vehicle.

However, if a limitation is imposed on the obstacle-detection distances of the left and right infrared beams to make the center infrared beam long, there may be a case in which the center infrared beam detects an obstacle first and suppresses the engine torque, but then, as the vehicle moves forward, the obstacle hides beneath the effective range of the center infrared beam or deviates to the left or right before entering the effective range of the left or right infrared beam, thereby becoming undetectable. In this case, the suppression once imposed on the engine torque would be canceled, and presumably, the risk of collision with the obstacle would increase.

SUMMARY

An obstacle detection device for a vehicle according to at least one embodiment of the present invention, which detects an obstacle in front by emitting an infrared beam in front of the vehicle, includes: a first emitting-and-receiving part disposed on a center part in a width direction of a vehicle and configured to emit an infrared beam to a center region in front of the vehicle and receive a reflected signal from an obstacle; a second emitting-and-receiving part disposed on at least one of a left side or a right side of the first emitting-and-receiving part and configured to: emit an infrared beam so that the infrared beam spreads to at least one of the left side or the right side adjacently to a detection region of the infrared beam from the first emitting-and-receiving part; and receive a reflected signal from the obstacle; and an effective-range control part configured to control a maximum effective distance of obstacle detection by the first emitting-and-receiving part and a maximum effective distance of obstacle detection by the second emitting-and-receiving part. The effective-range control part is configured to: set the maximum effective distance of the first emitting-and-receiving part longer than the maximum effective distance of the second emitting-and-receiving part; and extend the maximum effective distance of the second emitting-and-receiving part from an initial value when the obstacle is detected by the first emitting-and-receiving part. Accordingly, with the obstacle detection device for a vehicle which detects an obstacle in front by emitting an infrared beam in the center direction and at least one of the left or right direction in front of the vehicle, it is possible to prevent a decrease in the accuracy in detecting an obstacle that may occur when the obstacle detection distance of the infrared beam at the center is set longer than that of the infrared beam of at least one of the left side or the right side, whereby the accuracy in detecting an obstacle is improved.

BRIEF DESCRIPTION OF DRAWINGS

FIG. 5A is a side-view explanatory diagram illustrating a detection region of infrared beams of the obstacle detection device, where the obstacle-detection distances of the second receiving-and-emitting parts at the left and the right are extended.

FIG. 5B is a side-view explanatory diagram illustrating a detection region of infrared beams of the obstacle detection device, where the obstacle-detection distances of the second receiving-and-emitting parts at the left and the right are extended.

FIG. 6 is a timing chart of the misacceleration mitigation control based on an obstacle-detection result obtained by the obstacle detection device in FIGS. 5A and 5B.

FIG. 7 is a control flowchart of the whole control of the obstacle detection device and the misacceleration mitigation device.

FIG. 8 is a flowchart of a subroutine for setting a detection-distance extension flag.

DETAILED DESCRIPTION

Figure 1:
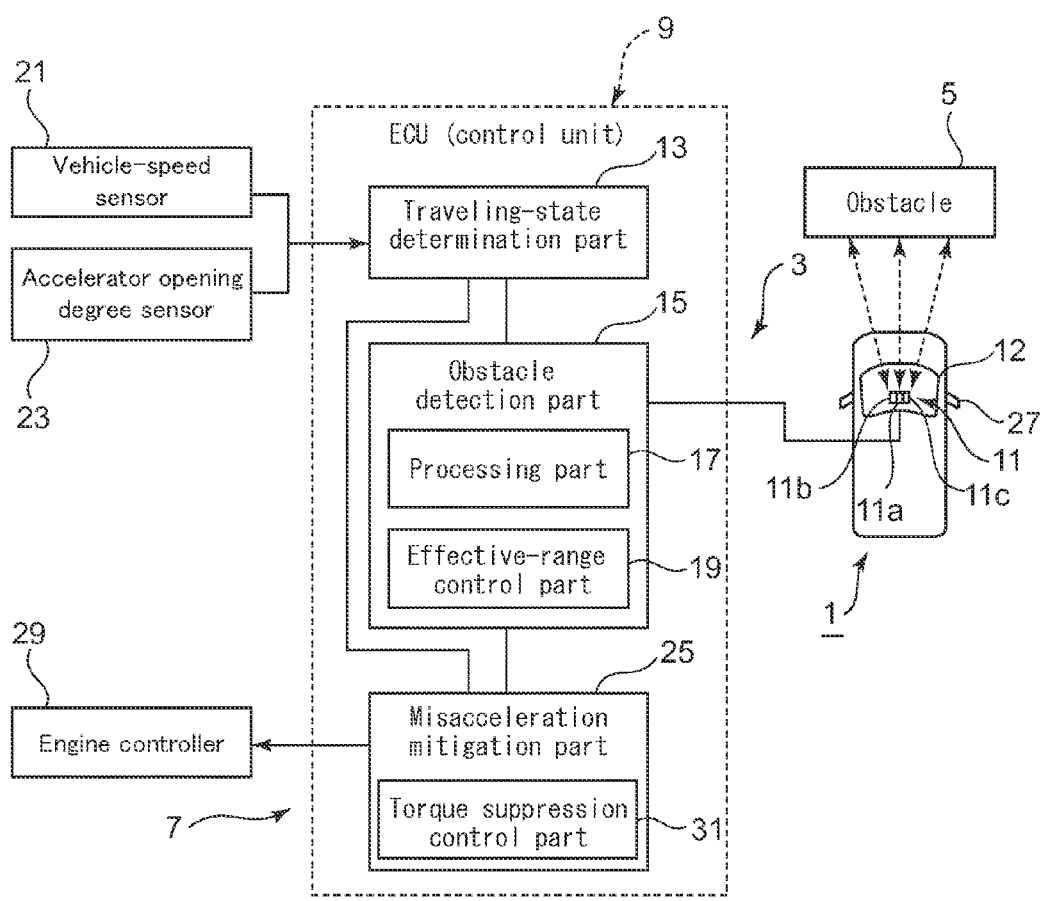
FIG. 1 is an overall configuration block diagram of an obstacle detection device and a misacceleration mitigation device according to one embodiment of the present invention.

With reference to the accompanied drawings, some embodiments of the present embodiments will be described. It is intended, however, that unless particularly specified, dimensions, materials, shapes, relative positions and the like of components described in the embodiments or illustrated in the drawings shall be interpreted as illustrative only and not limitative of the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

With reference to FIG. 1, an overall configuration of an obstacle detection device 3 for a vehicle 1 according to the present embodiment, and a misacceleration mitigation device 7 using the same will be described.

As an overall configuration, the obstacle detection device 3 of the vehicle 1 detects presence of an obstacle 5 within a predetermined distance in front of the vehicle 1 while the vehicle 1 is moving at a predetermined speed or less or is standing, and the misacceleration mitigation device 7 suppresses acceleration or start of the vehicle 1 when the obstacle detection device 3 detects the obstacle 5 in front of the vehicle 1.

The obstacle detection device 3 basically includes a controller 9 constituted of an electronic control unit (ECU), and an obstacle sensor part 11 which emits and receives infrared beams to and from the obstacle 5.

Figure 2A:
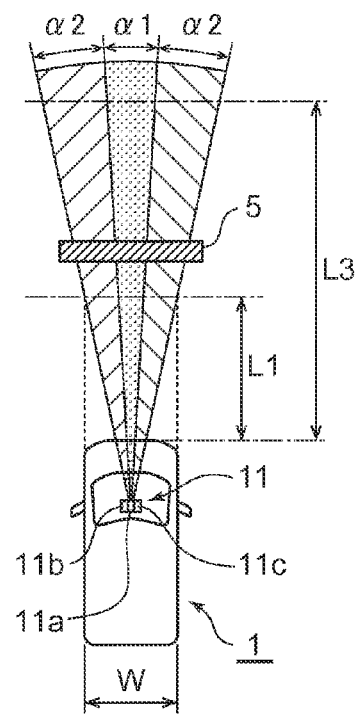
FIG. 2A is a planar explanatory diagram illustrating a detection region of infrared beams of the obstacle detection device.
Figure 2B:
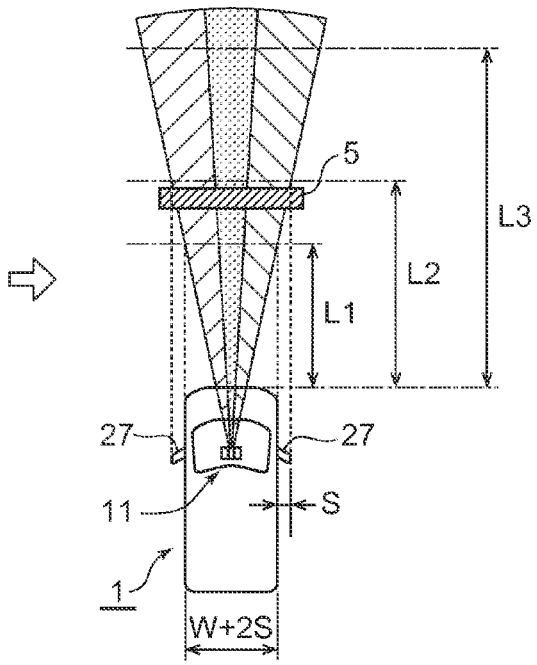
FIG. 2B is a planar explanatory diagram illustrating a detection region of infrared beams of the obstacle detection device.

The obstacle sensor part 11 includes the first emitting-and-receiving part 11a which is disposed on an upper part of a front window 12 inside a vehicle compartment, at a center part in the width direction of the vehicle 1, and which emits an infrared beam to a center region in the width of the vehicle in front of the vehicle and receives a signal of a reflected wave of the emitted infrared beam which returns after striking the obstacle 5 existing in front of the vehicle 1, and the second emitting-and-receiving parts 11b, 11c which are disposed on both of the left side and the right side, respectively, of the first emitting-and-receiving part 11a and which emit infrared beams so that the infrared beams spread to both of the left and right sides adjacently to the detection region of the infrared beam from the first emitting-and-receiving part 11a in a planar view and receive reflected signals from the obstacle 5 (see FIGS. 1, 2A and 2B).

The second emitting-and-receiving parts do not need to be disposed on both of the left and right sides of the first emitting-and-receiving part 11a, respectively, and it is sufficient if the second emitting-and-receiving part is disposed on at least one of the left and right sides of the first emitting-and-receiving part 11a. In the present embodiment, as described later, it is preferred to provide the second emitting-and-receiving parts 11b, 11c on both of the left and right sides of the first emitting-and-receiving part 11a, respectively, because in this way it is possible to detect an obstacle in a wider range using the infrared beams from the second emitting-and-receiving parts 11b, 11c disposed respectively on both of the left and right sides of the first emitting-and-receiving part 11a even if the obstacle deviates from the expansion range of the center infrared beam and becomes undetectable.

Further, the controller 9 includes a traveling-state determination part 13 and an obstacle detection part 15. The obstacle detection part 15 further includes a processing part 17 and an effective-range control part 19.

To the traveling-state determination part 13 of the controller 9, a signal from a vehicle-speed sensor 21 for detecting the vehicle speed of the vehicle 1, a signal from an accelerator opening degree sensor 23 for detecting a pressing amount of an accelerator pedal which is operated by a driver for acceleration and deceleration, and signals indicating various other traveling states, are inputted.

The traveling-state determination part 13 determines whether the vehicle 1 is traveling at a predetermined vehicle speed (e.g. 10 Km/h) or less, or the vehicle 1 is standing. Further, it is determined whether the accelerator pedal is pressed in.

At the processing part 17 of the obstacle detection part 15, with the first emitting-and-receiving part 11a and the second emitting-and-receiving parts 11b, 11c, whether the obstacle 5 is present within the maximum effective range (maximum effective distance) is determined and the distance between the vehicle 1 and the obstacle 5 is calculated on the basis of the time from the emission of the infrared beams and reception of reflected signals from the obstacle 5, and signals of the distance to the obstacle 5, the vehicle speed, the pressing amount of the accelerator pedal, and the like are outputted to a misacceleration mitigation part 25 described below.

Further, at the effective-range control part 19 of the obstacle detection part 15, the maximum effective range (maximum effective distance) of the infrared beams which are emitted from the second emitting-and-receiving parts 11b, 11c disposed respectively on both of the left and rights sides and whose reflected waves are used to determine the presence of the obstacle 5 is controlled variably.

Specifically, the maximum effective range (maximum effective distance) is the maximum distance in front of the vehicle in which the presence of the obstacle 5 is determined by the processing part 17, and determination of the presence of an obstacle is effective in the maximum effective range and within a region in which the infrared beams spread, which is a region in which the obstacle hits the infrared beams.

In the present embodiment, the obstacle sensor part 11 includes three emitting-and-receiving parts in the illustrated example: the first emitting-and-receiving part 11a at the center, and the second emitting-and-receiving parts 11b, 11c at the left and the right. However, it is sufficient if the obstacle sensor part 11 is divided into a center part and left and right parts. For instance, the obstacle sensor part 11 may be constituted of four emitting-and-receiving parts: two at the center part and two at the left and right parts.

As illustrated in FIGS. 2A and 2B, in a planar view, the first emitting-and-receiving part 11a emits and receives an infrared beam at a predetermined expansion angle ($\alpha 1$) in the horizontal direction in front, and the second emitting-and-receiving parts 11b, 11c each emit and receive an infrared beam at a predetermined expansion angle ($\alpha 2$) in the horizontal direction in front. The regions (region $\alpha 1$, region $\alpha 2$) form adjacent regions slightly overlapping with one another.

Further, as illustrated in FIGS. 3A, 3B, 3C, 5A and 5B, also in a side view, the first emitting-and-receiving part 11a emits and receives an infrared beam at a predetermined expansion angle ($\beta 1$) in the vertical direction in front, and the second emitting-and-receiving parts 11b, 11c each emit and receive an infrared beam at a predetermined expansion angle ($\beta 2$) in the vertical direction in front. The regions (region $\beta 1$, region $\beta 2$) form adjacent regions such that the region $\beta$ which is the emitting-and-receiving region from the second emitting-and-receiving parts 11b, 11c forms a region adjacent to a lower part of the region $\beta 1$ of the first emitting-and-receiving part 11a so as to slightly overlap with one another. In this way, even if an obstacle is no longer detectable by the first emitting-and-receiving part 11a, it is possible to detect the obstacle with the second emitting-and-receiving parts 11b, 11c instantly.

The relationship between the first emitting-and-receiving part 11a at the center and the second emitting-and-receiving parts 11b, 11c at the left and the right is as follows: as illustrated in FIG. 2A, the maximum effective range L1 (initial value) of the second emitting-and-receiving parts 11b, 11c at the left and the right is set to a distance at the initial value L1 of the maximum effective range which is shorter than the maximum effective range L3 of the first emitting-and-receiving part 11a at the center, so that a pedestrian or an object in a side-strip region at the outer left or right side of the traveling range of the vehicle is not wrongly detected as an obstacle that may be a collision object.

In a case where there is a difference between the maximum effective range L3 of the first emitting-and-receiving part 11a at the center and the maximum effective range L1 (initial value) of the second emitting-and-receiving parts 11b, 11c at the left and the right as described above, the engine torque suppression control described below operates as follows when the vehicle 1 moves forward.

Figure 3A:
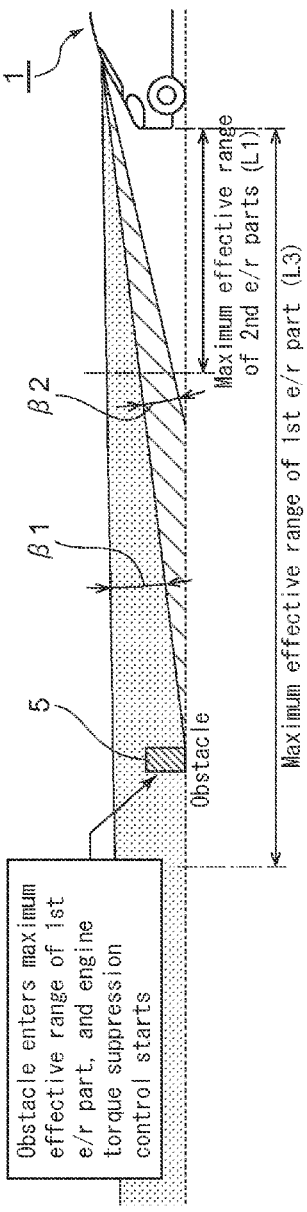
FIG. 3A is a side-view explanatory diagram illustrating a detection region of infrared beams of the obstacle detection device, where the obstacle-detection distances of the second receiving-and-emitting parts at the left and the right are at initial values.

(1) As illustrated in FIG. 3A, when the obstacle 5 enters the maximum effective range L3 in the region $\alpha 1$ (FIG. 2A) and the region $\beta 1$ at the center, firstly the presence of the obstacle 5 is detected, and the engine torque suppression control is started to suppress acceleration and start.

Figure 3B:
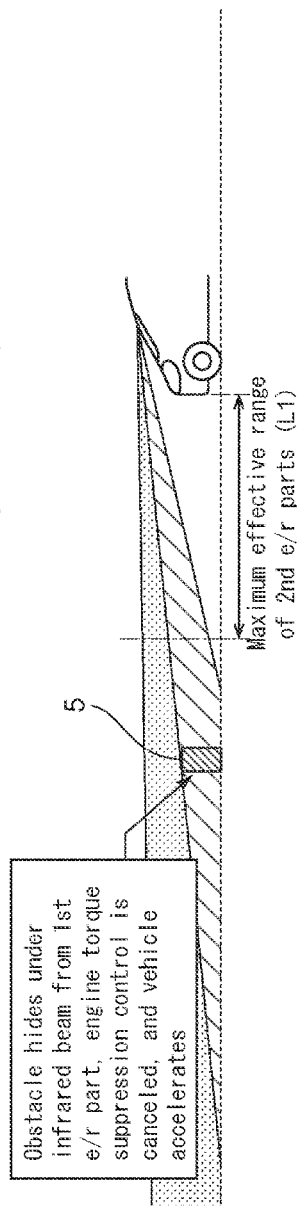
FIG. 3B is a side-view explanatory diagram illustrating a detection region of infrared beams of the obstacle detection device, where the obstacle-detection distances of the second receiving-and-emitting parts at the left and the right are at initial values.

(2) As the vehicle 1 advances further, as illustrated in FIG. 3B, the obstacle 5 may hide under the expansion angle (region $\beta 1$) in the vertical direction of the infrared beam from the first emitting-and-receiving part 11a (if the height of the obstacle 5 is such that the obstacle 5 goes under $\beta 1$), whereby the engine torque suppression control once having been started is canceled and acceleration or start of the vehicle 1 is started.

Figure 3C:
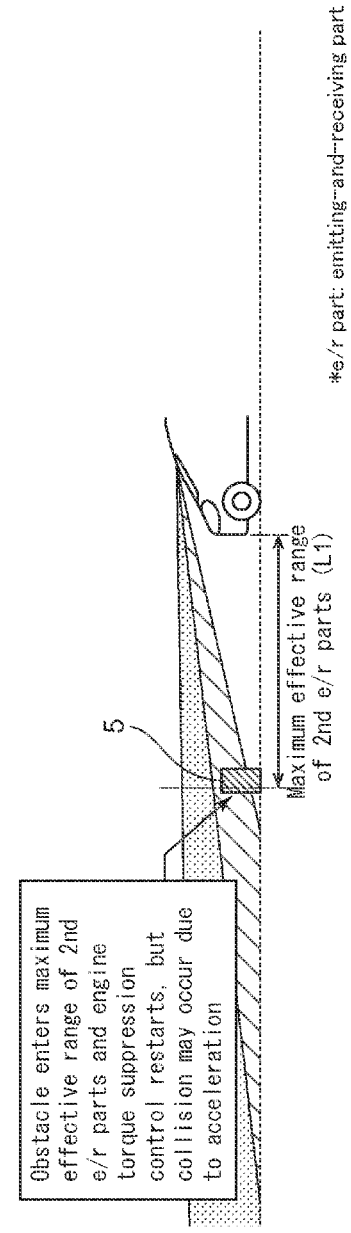
FIG. 3C is a side-view explanatory diagram illustrating a detection region of infrared beams of the obstacle detection device, where the obstacle-detection distances of the second receiving-and-emitting parts at the left and the right are at initial values.

(3) Further, as the vehicle 1 advances, as illustrated in FIG. 3C, the obstacle 5 enters the maximum effective range L1 in the region $\alpha 2$ and the region $\beta 2$ of the second emitting-and-receiving parts 11b, 11c at the left and right to be detected again as an obstacle, so that the engine torque suppression control is restarted and acceleration and start are suppressed. It is sufficient if the obstacle 5 is detected by either one of the second emitting-and-receiving parts 11b, 11c at the left and the right.

As described above, the engine torque suppression once having been operated is canceled, and the control for acceleration and start is started, which increases the risk of collision with the obstacle.

A situation in which the once operated engine torque suppression is canceled illustrated in FIGS. 3A, 3B and 3C will now be described with reference to the timing chart of FIG. 4. The states in FIGS. 3A, 3B, and 3C are represented by points of time A, B, and C in FIG. 4, respectively.

Figure 4:
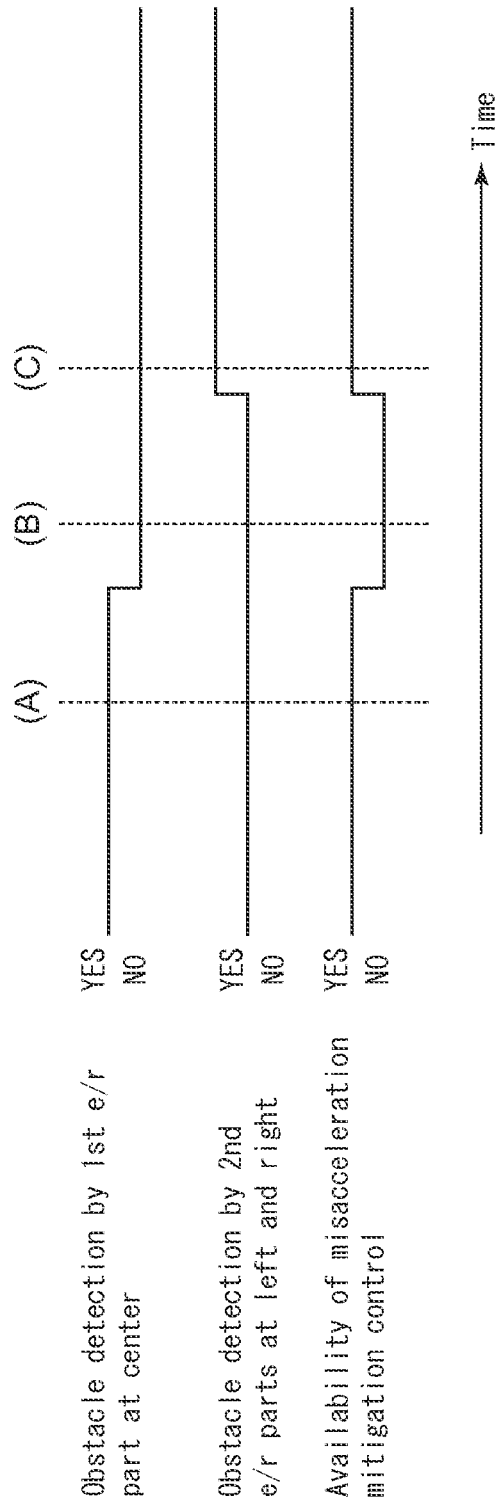
FIG. 4 is a timing chart of a misacceleration mitigation control based on an obstacle-detection result obtained by the obstacle detection device in FIGS. 3A, 3B and 3C.

Accordingly, at the point of time A in FIG. 4, the first emitting-and-receiving part 11a is detecting an obstacle while the second emitting-and-receiving parts 11b, 11c are not detecting an obstacle. As a result, the misacceleration mitigation control is in operation. At the point of time B in FIG. 4, all of the first emitting-and-receiving part 11a and the second emitting-and-receiving parts 11b, 11c are not detecting an obstacle. As a result, operation of the misacceleration mitigation control is canceled. At the point of time C in FIG. 4, the first emitting-and-receiving part 11a is not detecting an obstacle while the second emitting-and-receiving parts 11b, 11c are detecting an obstacle. As a result, the misacceleration mitigation control is in operation.

Therefore, at the point of time B in FIG. 4, the once operated engine torque suppression is canceled, which increases the risk of collision with the obstacle.

In the present embodiment, the above situation is improved by variably controlling the maximum effective range (maximum effective distance) of the infrared beams emitted from the second emitting-and-receiving parts 11b, 11c disposed respectively on both of the left and right sides at the effective-range control part 19 of the obstacle detection part 15 from the initial value L1 to the extended value L2, as illustrated in FIG. 2B.

The improved state will be described with reference to FIGS. 5A, 5B and 6 which correspond to FIGS. 3A, 3B, 3C and 4.

(1) As illustrated in FIG. 5A, when the obstacle 5 enters the maximum effective range L3 in the region α1 (FIG. 2A) and the region β1 at the center, firstly the presence of the obstacle 5 is detected, and the following engine torque suppression control is started to suppress acceleration and start. FIG. 5A is similar to FIG. 3A.

(2) When the vehicle 1 further advances, as illustrated in FIG. 5B, the obstacle 5 may hide under the expansion angle (β1) in the vertical direction of the first emitting-and-receiving part 11a. However, when the obstacle 5 is detected by the first emitting-and-receiving part 11a, it is predicted that the obstacle would become undetectable by the first emitting-and-receiving part 11a later on, and the maximum effective range (maximum effective distance) of the infrared beams from the second emitting-and-receiving parts 11b, 11c is extended to an extended value L2. As a result of the above extension, the obstacle 5 enters the maximum effective range of the second emitting-and-receiving parts 11b, 11c and becomes detectable.

The situation in which the obstacle becomes detectable by the second emitting-and-receiving parts 11b, 11c in FIGS. 5A and 5B will now be described with reference to the timing chart of FIG. 6. The states in FIGS. 5A and 5B are represented by points of time A and B in FIG. 6, respectively.

Accordingly, at the point of time A in FIG. 6, the first emitting-and-receiving part 11a is detecting an obstacle while the second emitting-and-receiving parts 11b, 11c are not detecting an obstacle. As a result, the misacceleration mitigation control is in operation. At the point of time B in FIG. 6, the first emitting-and-receiving part 11a is not detecting an obstacle while the second emitting-and-receiving parts 11b, 11c are detecting an obstacle. As a result, the misacceleration mitigation control is in operation.

Thus, as illustrated in FIG. 6, the engine torque suppression is continued without being canceled temporarily, which reduces the risk of collision with an obstacle.

As illustrated in FIG. 2A, the initial value L1 of the maximum effective range (maximum effective distance) is a distance to an intersection between an extended line of the vehicle-body width W of the vehicle 1 toward the front of the vehicle and a left or right boundary line of the region α2 of the second emitting-and-receiving parts 11b, 11c.

As described above, since the initial value L1 is a distance from the front edge of the vehicle 1 to the intersection between the extended line of the vehicle-body width W and the left or right boundary line of the region α2 from the second emitting-and-receiving parts 11b, 11c, an obstacle outside the vehicle-body width W is not detected in the state of the initial value L1, so as to reduce wrong judgments of objects that do not affect front collision of the vehicle 1.

Further, as illustrated in FIG. 2B, the extended value L2 is a distance to an intersection between an extended line of a total width (W+2 S) of the vehicle-body width W of the vehicle 1 and widths S of side mirrors 27 extended toward the front of the vehicle and a left or right boundary line of the region α2 from the second emitting-and-receiving parts 11b, 11c.

As described above, the extended value L2 is a distance to an intersection between an extended line of a total width (W+2 S) of the vehicle-body width W of the vehicle 1 and the widths S of the side mirrors 27 and a left or right boundary line of the region α2 of the second emitting-and-receiving parts 11b, 11c.

In this way, even when the maximum effective range of the second emitting-and-receiving parts 11b, 11c is extended, it is possible to reduce wrong judgments of an object that does not affect or relate to the front collision as much as possible.

Here, the extended value L2 may be set as a value obtained by not only adding the widths S of the side mirrors 27 alone, but also adding some extra length (cm) further to the widths of the side mirrors 27, and may be set as a level that does not cause wrong judgments on the basis of a test or the like.

Next, the misacceleration mitigation device 7 will be described. As illustrated in FIG. 1, the misacceleration mitigation device 7 basically includes a controller 9 constituted of an electronic control unit (ECU), and an engine controller 29 which executes the engine torque suppression control.

The controller 9 includes a misacceleration mitigation part 25, and the misacceleration mitigation part 25 includes a torque suppression control part 31.

The engine controller 29 for executing the engine torque suppression control controls the engine output by controlling the amount of fuel injection, the timing of ignition, or the like, on the basis of a signal from the vehicle-speed sensor 21 or a sensor of the accelerator opening degree sensor 23. Further, the engine controller 29 controls the engine output to be suppressed on the basis of a signal of the detection result of the obstacle 5 from the obstacle detection part 15 mentioned above and suppresses acceleration or start of the vehicle 1 at the time when the accelerator pedal is pressed in.

Next, with reference to the flowchart of FIGS. 7 and 8, the obstacle detection control and the misacceleration mitigation control executed by the controller 9 will be described.

FIG. 7 is a flowchart of the entire control of the obstacle detection control and the misacceleration mitigation control. FIG. 8 is a flowchart of a subroutine for setting the effective-range extension flag.

In FIG. 7, in step S1, various sensor signals representing the vehicle operation state, such as signals from the vehicle-speed sensor 21, the accelerator opening degree sensor 23, and the like, are read. In step S2, it is determined whether the vehicle 1 is traveling at a predetermined vehicle speed (e.g. 10 Km/h) or less, or the vehicle 1 is standing.

Next, in step S3, an extension flag which extends the maximum effective range for obstacle detection by the second emitting-and-receiving parts 11b, 11c is set. The subroutine for setting the extension flag will be described later.

In step S4, it is determined whether the extension flag set in step S3 is ON or OFF. If the extension flag is ON, the process advances to step S6, where the maximum effective range for obstacle detection by the second emitting-and-receiving parts 11b, 11c is extended from the initial value L1 to the extended value L2. As described above, the extended value L2 is set as a range in which the infrared beams from the second emitting-and-receiving parts 11b, 11c spread to the total width (W+2 S) of the vehicle-body width W and the widths S of the side mirrors 27.

On the other hand, if the extension flag is OFF, the process advances to step S5, where the maximum effective range for obstacle detection by the second emitting-and-receiving parts 11b, 11c is set to the initial value L1. Also as described above, the initial value L1 is set as a range in which the infrared beams from the second emitting-and-receiving parts 11b, 11c spread to the width W.

In step S7, it is determined whether the obstacle 5 is detected by the first emitting-and-receiving part 11a or the second emitting-and-receiving parts 11b, 11c. If the obstacle 5 is detected, the process advances to step S8, where the determination for the engine torque suppression control is executed to suppress acceleration or start of the vehicle 1. If the obstacle 5 is not detected in step S7, the process advances to step S9, and the determination for the engine torque suppression control is disabled. Also, if the vehicle speed is not the predetermined vehicle speed or less in step S2, the determination for the engine torque suppression control based on the detection result of the obstacle 5 by the first emitting-and-receiving part 11a and the second emitting-and-receiving parts 11b, 11c is disabled.

Next, with reference to FIG. 8, the subroutine for setting the effective-range extension flag in step S3 will be described.

In step S11, it is determined whether an obstacle is detected by the first emitting-and-receiving part 11a, and if an obstacle is detected, the process advances to step S12, where the effective-range extension flag which enables extension of the maximum effective range of the second emitting-and-receiving parts 11b, 11c is turned ON, and the extension flag OFF timer is set to zero.

In step S11, if it is determined that an obstacle is not detected by the first emitting-and-receiving part 11a, then in step S13, it is determined whether the obstacle 5 is detected by at least one of the left one or the right one of the second emitting-and-receiving parts 11b, 11c. If the obstacle 5 is detected by at least one of the second emitting-and-receiving parts 11b, 11c, the determination result is Yes, and thus the process advances to step S8 in FIG. 7, where the engine torque suppression control is executed to suppress acceleration or start of the vehicle 1.

On the other hand, in step S13, if the obstacle 5 is not detected by any of the second emitting-and-receiving parts 11b, 11c, the determination result is No, and thus the process advances to step S14, where it is determined whether the effective-range extension flag of the second emitting-and-receiving parts 11b, 11c is ON.

If the determination result is Yes and the effective-range extension flag is ON, in step S15, the period for control processing is added to the extension flag OFF timer. Specifically, the time from when an obstacle becomes undetectable by the first emitting-and-receiving part 11a to the time when the effective-range extension flag of the second emitting-and-receiving parts 11b, 11c is turned OFF is calculated. Then, in step S16, it is determined whether the extension flag OFF timer has exceeded a predetermined value. The predetermined value is preferably in a range of from 100 milliseconds to a couple of seconds, for instance.

In this way, with the effective range extended only in a predetermined time, even when the maximum effective range for obstacle detection by the second emitting-and-receiving parts 11b, 11c at the left and the right is extended, it is possible to reduce wrong judgments of an object that does not affect or relate to the front collision due to the extension, such as a pedestrian or an object in a side-strip region, as much as possible.

In step S16, if the extension flag OFF timer has exceeded a predetermined value, then in step S17, the effective-range extension flag of the second emitting-and-receiving parts 11b, 11c is turned OFF, and the extension flag OFF timer is also reset to zero.

According to the above described embodiments, the effective-range control part 19 extends the maximum effective range for obstacle detection by the second emitting-and-receiving parts 11b, 11c from the initial value L1 to the extended value L2 when the obstacle 5 is detected by the first emitting-and-receiving part 11a, so that the obstacle 5 becomes detectable by the infrared beams from the second emitting-and-receiving parts 11b, 11c even in a range where the obstacle 5 may get out of the beam-expansion range of the infrared beam at the center and become undetectable, by increasing the maximum effective range of the second emitting-and-receiving parts 11b, 11c, which makes it possible to prevent a decrease in the accuracy in detecting the obstacle 5. As a result, it is possible to enhance the stability of the misacceleration mitigation control of the vehicle 1.

Specifically, since the torque suppression control part 31 which controls the engine torque to be suppressed on the basis of the obstacle detection signal from the obstacle detection part 15, it is possible to perform the engine torque suppression control accurately in response to the obstacle detection signal obtained by the obstacle detection part 15. As a result, the misacceleration mitigation control is performed securely.

INDUSTRIAL APPLICABILITY

According to one embodiment of the present invention, with the obstacle detection device for a vehicle which detects an obstacle in front by emitting an infrared beam in the center direction and at least one of the left or right direction toward the front of the vehicle, it is possible to prevent a decrease in the accuracy in detecting an obstacle that may occur when the maximum obstacle detection distance of the infrared beam at the center is set longer than that of the infrared beam of at least one of the left side or the right side to improve the accuracy in detecting an obstacle, and further, to enhance the stability of the misacceleration mitigation control of the vehicle. Thus, the present invention can be applied effectively to an obstacle detection device for a vehicle and a misacceleration mitigation device.

The invention claimed is:

1. An obstacle detection device for a vehicle which detects an obstacle in front by emitting an infrared beam in front of the vehicle, comprising:
    a first emitting-and-receiving part disposed on a center part in a width direction of a vehicle and configured to emit an infrared beam to a center region in front of the vehicle and receive a reflected signal from an obstacle;
    a second emitting-and-receiving part disposed on at least one of a left side or a right side of the first emitting-and-receiving part and configured to: emit an infrared beam so that the infrared beam spreads to at least one of the left side or the right side adjacently to a detection region of the infrared beam from the first emitting-and-receiving part; and receive a reflected signal from the obstacle; and
    an effective-range control part configured to control a maximum effective distance of obstacle detection by the first emitting-and-receiving part and a maximum effective distance of obstacle detection by the second emitting-and-receiving part,
    wherein the effective-range control part is configured to:
        set the maximum effective distance of the first emitting-and-receiving part longer than the maximum effective distance of the second emitting-and-receiving part; and
        extend the maximum effective distance of the second emitting-and-receiving part from an initial value when the obstacle is detected by the first emitting-and-receiving part.

2. The obstacle detection device for a vehicle according to claim 1,
wherein the second emitting-and-receiving part is disposed on each of the left side and the right side of the first emitting-and-receiving part.

3. The obstacle detection device for a vehicle according to claim 1,
wherein the initial value of the maximum effective distance of the second emitting-and-receiving part is a distance to an intersection between an extended line of a vehicle-body width of the vehicle and a boundary line of an outgoing beam from the second emitting-and-receiving part.

4. The obstacle detection device for a vehicle according to claim 2,
wherein the initial value of the maximum effective distance of the second emitting-and-receiving part is a distance to an intersection between an extended line of a vehicle-body width of the vehicle and a boundary line of an outgoing beam from the second emitting-and-receiving part.

5. The obstacle detection device for a vehicle according to claim 1,
wherein the maximum effective distance of the second emitting-and-receiving part extended from the initial value is a distance to an intersection between an extended line of a total width of a vehicle-body width of the vehicle and widths of side mirrors and a boundary of an outgoing beam from the second emitting-and-receiving part.

6. The obstacle detection device for a vehicle according to claim 2,
wherein the maximum effective distance of the second emitting-and-receiving part extended from the initial value is a distance to an intersection between an extended line of a total width of a vehicle-body width of the vehicle and widths of side mirrors and a boundary of an outgoing beam from the second emitting-and-receiving part.

7. The obstacle detection device for a vehicle according to claim 3,
wherein the maximum effective distance of the second emitting-and-receiving part extended from the initial value is a distance to an intersection between an extended line of a total width of the vehicle-body width of the vehicle and widths of side mirrors and the boundary of the outgoing beam from the second emitting-and-receiving part.

8. The obstacle detection device for a vehicle according to claim 4,
wherein the maximum effective distance of the second emitting-and-receiving part extended from the initial value is a distance to an intersection between an extended line of a total width of the vehicle-body width of the vehicle and widths of side mirrors and the boundary of the outgoing beam from the second emitting-and-receiving part.

9. The obstacle detection device for a vehicle according to claim 1,
wherein the effective-range control part is configured to perform a control of extending the maximum effective distance of the second emitting-and-receiving part from the initial value only for a predetermined period of time after detection of the obstacle by the first emitting-and-receiving part.

10. The obstacle detection device for a vehicle according to claim 2,
wherein the effective-range control part is configured to perform a control of extending the maximum effective distance of the second emitting-and-receiving part from the initial value only for a predetermined period of time after detection of the obstacle by the first emitting-and-receiving part.

11. The obstacle detection device for a vehicle according to claim 5,
wherein the effective-range control part is configured to perform a control of extending the maximum effective distance of the second emitting-and-receiving part from the initial value only for a predetermined period of time after detection of the obstacle by the first emitting-and-receiving part.

12. The obstacle detection device for a vehicle according to claim 6,
wherein the effective-range control part is configured to perform a control of extending the maximum effective distance of the second emitting-and-receiving part from the initial value only for a predetermined period of time after detection of the obstacle by the first emitting-and-receiving part.

13. The obstacle detection device for a vehicle according to claim 7,
wherein the effective-range control part is configured to perform a control of extending the maximum effective distance of the second emitting-and-receiving part from the initial value only for a predetermined period of time after detection of the obstacle by the first emitting-and-receiving part.

14. The obstacle detection device for a vehicle according to claim 8,
wherein the effective-range control part is configured to perform a control of extending the maximum effective distance of the second emitting-and-receiving part from the initial value only for a predetermined period of time after detection of the obstacle by the first emitting-and-receiving part.

15. The obstacle detection device for a vehicle according to claim 9,
wherein the predetermined period of time is within a range of from 100 milliseconds to a couple of seconds.

16. A misacceleration mitigation device, comprising
a torque suppression control part configured to control an engine torque to be suppressed on the basis of an obstacle detection signal from the obstacle detection device for a vehicle according to claim 1.

* * * * *